H. B. SNELL.
SHOCK ABSORBER.
APPLICATION FILED SEPT. 24, 1915.
1,197,675.
Patented Sept. 12, 1916.
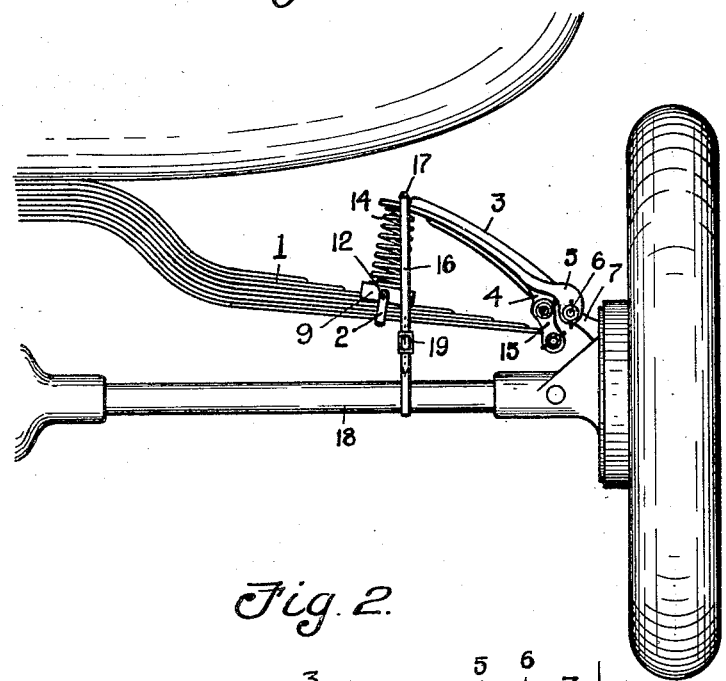
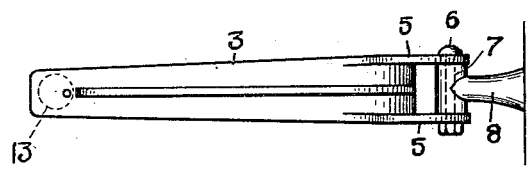
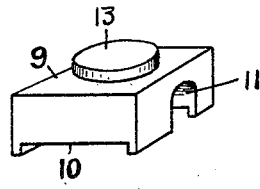
INVENTOR
Harry B. Snell.
BY
George J. Ottoch
ATTORNEY

UNITED STATES PATENT OFFICE.

HARRY B. SNELL, OF SOUTH BEND, INDIANA.

SHOCK-ABSORBER.

1,197,675.  Specification of Letters Patent.  Patented Sept. 12, 1916.

Application filed September 24, 1915. Serial No. 52,356.

*To all whom it may concern:*

Be it known that I, HARRY B. SNELL, a citizen of the United States, residing at South Bend, in the county of St. Joseph and State of Indiana, have invented certain new and useful Improvements in Shock-Absorbers, of which the following is a specification.

The invention relates to an improvement in shock absorbers designed particularly for automobiles utilizing a transverse spring support.

The invention comprehends a shock absorber involving an auxiliary spring to form a resistance element between the vehicle frame structure and the main spring, combined with means whereby the tension of the auxiliary spring may be readily and quickly adjusted in accordance with the live load to which the machine is to be subjected at any particular time.

The invention in the preferred form of details will be described in the following specification, reference being had particularly to the accompanying drawings, in which:

Figure 1 is a view in elevation illustrating the application of the improved shock absorber; Fig. 2 is a plan of the connecting lever, showing the same attached to the fixed spring shackle eye; Fig. 3 is a perspective view of the bearing block for the main spring.

The shock absorber of the present improvement is designed for use in connection with automobiles involving the use of a transversely disposed main spring 1, the leaves of which are, as usual, secured against displacement by spring clips 2.

The improved shock absorber comprises a lever 3 in the form of an arm, which near one end is provided with a depending shackle eye 4, and extending beyond the shackle eye in the form of spaced parallel arms 5, which through the medium of the usual bolts 6, are utilized to pivotally connect the lever to the fixed shackle eye 7 forming the terminal of the post 8 projecting from the axle.

In connection with the lever I provide a bearing block 9 in the form of a rectangular member which on the under surface is formed in one direction with a rectangular recess 10 to snugly fit over and engage the upper leaf of the main spring 1, the block being also recessed at 11 at right angles to the recess 10, such recess 11 snugly receiving the bolt 12 of the particular spring clip 2. The opposing surfaces of the bearing block and lever, that is the surfaces arranged next to each other are each formed with studs 13 to receive and engage the opposing end coils of an auxiliary spring 14, the latter being of appropriate tension and length. The usual shackle 15 connects the shackle terminal of the main spring with the shackle eye 4 of the lever, and the lever is of such length and the bearing block so disposed on the main spring, that the auxiliary spring 14 supported between the block and lever is normally in an upright slightly inclined position, so that the approach of the lever end toward the main spring tends, through the pivotal connection to the lever to force the spring to a more nearly vertical position.

In connection with the structure described and as a particularly important part thereof I provide a means for adjusting the tension of the auxiliary spring in accordance with the particular live load to which the vehicle body may at the time be subjected. The adjusting means comprehends a strap member 16, which at a convenient point in its length is secured through the medium of a tap screw 17 to the lever 3, preferably at a point immediately above the auxiliary spring. The strap is passed about the axle 18, and its terminals connected by the usual buckle connection 19, or by any preferred type of connection which will permit the tightening of the strap at will.

The operation of the shock absorber will be obvious from the above description, it being appreciated that the auxiliary spring cushions the spring movement of the main spring, and that while the strap in no wise interferes with the downward movement of the lever, it tends to so snub the upward movement thereof that the rebound action of the main spring is taken up entirely by the auxiliary spring.

What is claimed is:

1. A shock absorber including a lever forming a pivotal connection between the axle and main spring of the vehicle, an auxiliary spring arranged between the lever and main spring, and means for adjusting the normal distance between said lever and the main spring to vary the normal tension of the auxiliary spring.

2. A shock absorber including a lever forming at one end a pivotal connection between the axle and main spring of a vehicle, an auxiliary spring arranged between the free end of the lever and main spring, and means connecting the axle and free end of the lever to limit the upward swing of said lever.

3. A shock absorber including a lever forming at one end a pivotal connection between the axle and main spring of a vehicle, an auxiliary spring arranged between the free end of the lever and main spring, and a strap engaging the lever and vehicle axle and adjustable to vary the tension of the auxiliary spring.

4. A shock absorber including a lever pivotally connected to the axle shackle eye, a shackle connection between said lever and the main spring of the vehicle, a bearing block recessed to engage a leaf of the main spring and further recessed to engage a clip bolt of the main spring, an auxiliary spring bearing between the block and free end of the lever, and a strap overlying the free end of the lever and underlying the axle.

5. A shock absorber including a lever pivotally connected to the axle shackle eye, a shackle connection between said lever and the main spring of the vehicle, a bearing block recessed to engage a leaf of the main spring and further recessed to engage a clip bolt of the main spring, an auxiliary spring bearing between the block and free end of the lever, and an adjustable strap overlying the free end of the lever and underlying the axle, said strap being removably connected to the lever.

In testimony whereof I affix my signature in presence of two witnesses.

HARRY B. SNELL.

Witnesses:
 LELA W. COOK,
 GEORGE J. OLTSCH.

Copies of this patent may be obtained for five cents each, by addressing the "Commissioner of Patents, Washington, D. C."